United States Patent
Muraishi et al.

(10) Patent No.: US 10,884,683 B2
(45) Date of Patent: Jan. 5, 2021

(54) INFORMATION PROCESSING SYSTEM AND NON-TRANSITORY COMPUTER READABLE MEDIUM THAT SPECIFIES AND NOTIFIES A CLIENT CONTACT ADDRESS

(71) Applicant: FUJI XEROX CO., LTD., Tokyo (JP)

(72) Inventors: Rie Muraishi, Kanagawa (JP); Tomoaki Hirano, Kanagawa (JP); Tomonori Tanaka, Kanagawa (JP); Manabu Hayashi, Kanagawa (JP); Tatsuo Mishima, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/545,126

(22) Filed: Aug. 20, 2019

(65) Prior Publication Data

US 2020/0301633 A1    Sep. 24, 2020

(30) Foreign Application Priority Data

Mar. 20, 2019    (JP) ................................ 2019-052036

(51) Int. Cl.
*G06F 3/12* (2006.01)
*H04N 1/00* (2006.01)
*H04N 1/32* (2006.01)

(52) U.S. Cl.
CPC .......... *G06F 3/1236* (2013.01); *G06F 3/1203* (2013.01); *G06F 3/1288* (2013.01); *H04N 1/0048* (2013.01); *H04N 1/3208* (2013.01); *H04N 2201/0017* (2013.01)

(58) Field of Classification Search
CPC .... G06F 3/1236; G06F 3/1288; G06F 3/1203; H04N 1/3208; H04N 1/0048; H04N 2201/0017
See application file for complete search history.

(56) References Cited

U.S. PATENT DOCUMENTS

| | | | |
|---|---|---|---|
| 9,854,056 B2 | 12/2017 | Kato | |
| 2009/0231637 A1* | 9/2009 | Kemmochi | H04N 1/2183 358/474 |
| 2015/0149623 A1 | 5/2015 | Numata | |
| 2017/0139655 A1* | 5/2017 | Narita | G06F 3/1286 |
| 2019/0079704 A1* | 3/2019 | Tokuchi | G06F 3/1288 |

FOREIGN PATENT DOCUMENTS

| | | |
|---|---|---|
| JP | 2015-103149 A | 6/2015 |
| JP | 2015-204087 A | 11/2015 |

* cited by examiner

*Primary Examiner* — Juan M Guillermety
(74) *Attorney, Agent, or Firm* — Oliff PLC

(57) ABSTRACT

An information processing system in which a client uses an information processing apparatus that is managed by an apparatus manager, includes a management unit that manages client information including a contact address of a client; an acquisition unit that acquires a notification content from an apparatus manager; a specification unit that specifies a contact address of a client that uses an information processing apparatus that is managed by the apparatus manager from which the acquisition unit has acquired the notification content, on the basis of the client information that is managed by the management unit; and a notification unit that gives a notification about the notification content acquired by the acquisition unit to the contact address of the client specified by the specification unit.

13 Claims, 9 Drawing Sheets

FIG. 4

| PROVIDER | APPARATUS | PROVIDING PLACE | CLIENT NAME | CONTACT ADDRESS |
|---|---|---|---|---|
| PROVIDER A | INFORMATION PROCESSING APPARATUS 10A | PROVIDING PLACE A | CLIENT X | admiX@xxx.jp |
| PROVIDER B | INFORMATION PROCESSING APPARATUS 10B | PROVIDING PLACE B | CLIENT X | admiX@xxx.jp |
| PROVIDER C | INFORMATION PROCESSING APPARATUS 10C | PROVIDING PLACE C | CLIENT Y | admiY@yyy.jp |
| | | | CLIENT Y | admiY@yyy.jp |

FIG. 8

<CLOSING INFORMATION>

NOTIFICATION OK

INPUT CLOSING DAYS

MONTH ☐ DAY ☐ TO MONTH ☐ DAY ☐

FIG. 9

<CONTENT INPUT>

NOTIFICATION OK

PLEASE INPUT NOTIFICATION CONTENT

"INPUT FIELD"

INFORMATION PROCESSING SYSTEM AND NON-TRANSITORY COMPUTER READABLE MEDIUM THAT SPECIFIES AND NOTIFIES A CLIENT CONTACT ADDRESS

CROSS-REFERENCE TO RELATED APPLICATIONS

This application is based on and claims priority under 35 USC 119 from Japanese Patent Application No. 2019-052036 filed Mar. 20, 2019.

BACKGROUND

(i) Technical Field

The present disclosure relates to an information processing system and a non-transitory computer readable medium.

(ii) Related Art

Japanese Unexamined Patent Application Publication No. 2015-103149 describes a system that separately manages operation information collected from image forming apparatuses disposed in a network of plural locations in tenant-based apparatus information memories with different access rights set therefor; tabulates part of the separately managed operation information on plural tenants on a client basis; and provides management by hiding or eliminating partial information included in the tabulated operation information so as to provide the managed operation information, to a user while giving a higher priority to information on a client with high degree of attention or to information on a client indicating an abnormal tabulated value.

In addition, Japanese Unexamined Patent Application Publication No. 2015-204087 describes a system that holds information included in management information on a first management tenant and in client information specific to a client managed at the first management tenant, as transfer information on the first management tenant; and when a second tenant that serves as a transfer target from the first management tenant is determined, that transfers the transfer information on the first management tenant to the second tenant.

While the technologies described in Japanese Unexamined Patent Application Publication No. 2015-103149 and Japanese Unexamined Patent Application Publication No. 2015-204087 are known, there is known, for example, a service in which a client of a company or the like under contract to use an information processing apparatus disposed in a public space such as a shared office.

With such a service, for example, an apparatus manager on the side of a provider that provides a service typically manages an information processing apparatus, and a manager on the side of a client that receives the provision of a service manages information on a client. Thus, the apparatus manager of the information processing apparatus may not freely view the information on the client. In this case, for example, the apparatus manager is not able to obtain the contact address or the like of the client although the apparatus manager wants to notify the client about a certain notification content, resulting in a situation in which a notification about the notification content is not given to the client.

SUMMARY

Aspects of non-limiting embodiments of the present disclosure relate to giving a notification about a notification content from an apparatus manager to a client that uses an information processing apparatus that is managed by the apparatus manager.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing system in which a client uses an information processing apparatus that is managed by an apparatus manager, the system including a management unit that manages client information including a contact address of a client; an acquisition unit that acquires a notification content from an apparatus manager; a specification unit that specifies a contact address of a client that uses an information processing apparatus that is managed by the apparatus manager from which the acquisition unit has acquired the notification content, on the basis of the client information that is managed by the management unit; and a notification unit that gives a notification about the notification content acquired by the acquisition unit to the contact address of the client specified by the specification unit.

BRIEF DESCRIPTION OF THE DRAWINGS

An exemplary embodiment of the present disclosure will be described in detail based on the following figures, wherein:

FIG. 4 illustrates a specific example of management information that is managed by the management server;

FIG. 8 illustrates a specific example of a display image that is used for inputting closing information;

FIG. 9 illustrates a specific example of a display image that is used for inputting a notification content;

DETAILED DESCRIPTION

Figure 1:
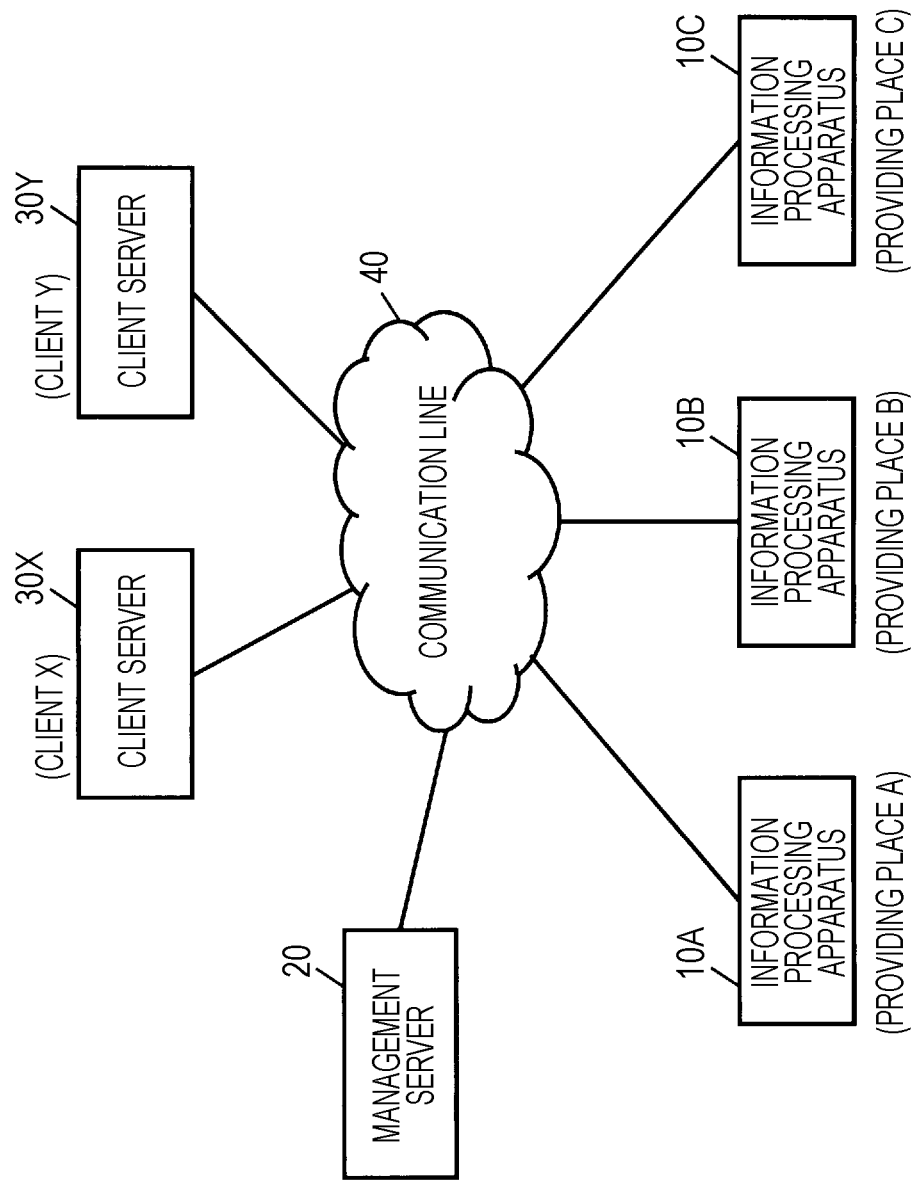
FIG. 1 illustrates a specific example of an information processing system.

FIG. 1 illustrates an example of a specific exemplary embodiment of the present disclosure. FIG. 1 illustrates a specific example of an information processing system including an information processing apparatus 10, a management server 20, and a client server 30. In the specific example illustrated in FIG. 1, the information processing apparatus 10, the management server 20, and the client server 30 are coupled to one another via a communication line 40 that uses, for example, at least one of wireless communication and wired communication.

The information processing apparatus 10 is an apparatus that is managed by an apparatus manager and that is used by a client. For example, the information processing apparatus 10 may be placed in any of various providing places and may be used by a client in the providing place of the service. In the specific example illustrated in FIG. 1, plural information processing apparatuses 10 (10A, 10B, and 10C) are disposed in plural providing places A, B, and C. Specific examples of the plural providing places A, B, and C include, for example, a public space, such as a shop or a shared office.

In the specific example illustrated in FIG. 1, the information processing apparatus 10A is disposed in the providing place A. The information processing apparatus 10A is managed by, for example, an apparatus manager of the providing place A. The apparatus manager of the providing place A may be, for example, a member (for example, an employee or a clerk) of a provider (for example, a company or a shop) that provides a use service of the information processing apparatus 10A in the providing place A; or a manager under a commission of management from a provider that provides a use service.

Then, for example, a client under contract of use with the provider that provides the use service of the information processing apparatus 10A uses the information processing apparatus 10A. Specific examples of the client that uses the information processing apparatus 10A include an organization such as a company. For example, when the client under contract to use the information processing apparatus 10A is an organization such as a company, an organization member who belongs to the organization may use the information processing apparatus 10A as a user.

In the specific example illustrated in FIG. 1, the information processing apparatus 10B is disposed in the providing place B, and the information processing apparatus 10C is disposed in the providing place C. The information processing apparatus 10B is managed by, for example, an apparatus manager of the providing place B, and is used by a client under contract to use the information processing apparatus 10B. The information processing apparatus 10C is managed by, for example, an apparatus manager of the providing place C, and is used by a client under contract to use the information processing apparatus 10C. It is to be noted that an information processing apparatus 10 other than the information processing apparatuses 10A, 10B, and 10C may be disposed in a providing place other than the providing places A, B, and C.

The management server 20 is one of specific examples of a management apparatus that manages client information including a contact address of a client that uses the information processing apparatuses 10. Specific examples of the contact address of the client that uses the information processing apparatus 10 include an email address of a manager of the client.

The client server 30 is a specific example of a client apparatus that is managed by a client that uses the information processing apparatus 10. FIG. 1 exemplarily illustrates plural client servers 30X and 30Y that are managed by plural clients X and Y. In the specific example illustrated in FIG. 1, the client server 30X is managed by the client X, and the client server 30Y is managed by the client Y.

Figure 2:
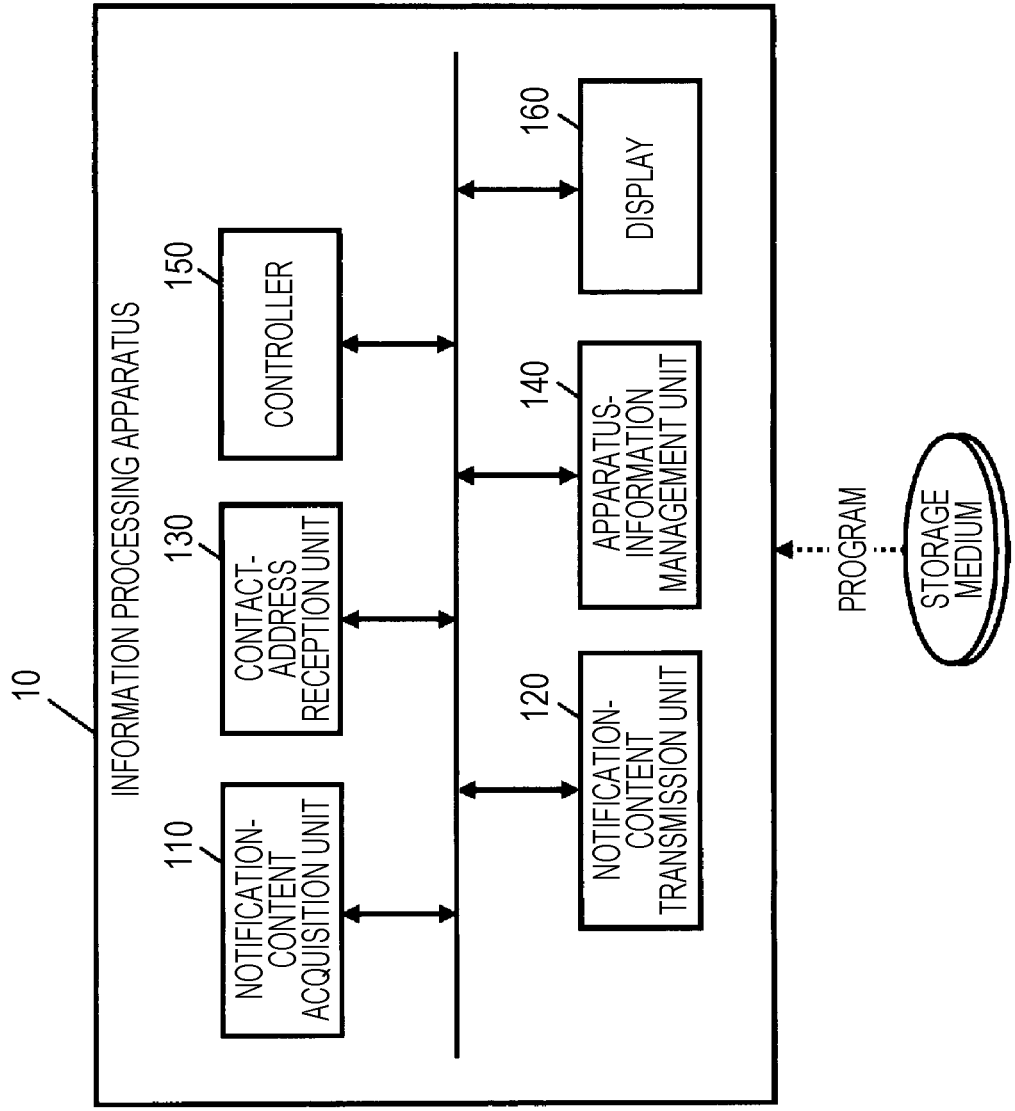
FIG. 2 illustrates a specific example of an information processing apparatus.

FIG. 2 illustrates a specific example of the information processing apparatus 10. FIG. 2 illustrates a specific example of the information processing apparatus 10 (10A, 10B, or 10C) that constitutes the information processing system in FIG. 1. The information processing apparatus 10 exemplarily illustrated in FIG. 2 includes a notification-content acquisition unit 110, a notification-content transmission unit 120, a contact-address reception unit 130, an apparatus-information management unit 140, a controller 150, and a display 160.

The notification-content acquisition unit 110 acquires a notification content from an apparatus manager of the information processing apparatus 10. When the apparatus manager of the information processing apparatus 10 wants to notify a client that uses the information processing apparatus 10 about a certain notification content, for example, the apparatus manager inputs the notification content by using an operation device or the like included in the information processing apparatus 10. The notification-content acquisition unit 110 acquires, for example, the notification content input by the apparatus manager using the operation device or the like.

The notification-content transmission unit 120 transmits the notification content acquired from the apparatus manager. The notification-content transmission unit 120 may transmit, for example, the notification content acquired by the notification-content acquisition unit 110 from the apparatus manager, to the management server 20 (FIG. 1). The notification-content transmission unit 120 may transmit the notification content acquired by the notification-content acquisition unit 110 from the apparatus manager, to the contact address of the client that uses the information processing apparatus 10.

The contact-address reception unit 130 receives and acquires the contact address of the client that uses the information processing apparatus 10 from the management server 20 (FIG. 1). For example, the notification-content transmission unit 120 transmits the notification content acquired from the apparatus manager to the contact address of the client acquired by the contact-address reception unit 130 from the management server 20. When a notification about the notification content acquired from the apparatus manager is given to the contact address of the client from the management server 20, the acquisition of the contact address of the client by the contact-address reception unit 130 may be omitted.

The apparatus-information management unit 140 stores and manages apparatus information relating to the information processing apparatus 10. The apparatus information that is managed by the apparatus-information management unit 140 may include identification information (for example, Internet protocol address) specific to the information processing apparatus 10. The apparatus information that is managed by the apparatus-information management unit 140 may be set or changed by the apparatus manager of the information processing apparatus 10.

The controller 150 centrally controls the entire information processing apparatus 10 exemplarily illustrated in FIG. 2. The controller 150 executes, for example, control in accordance with various programs. For example, the controller 150 may be provided by using an arithmetic processing device, such as a central processing unit (CPU) or a processor.

The display 160 displays, for example, a display image, such as a user interface image, for a user who uses the information processing apparatus 10 exemplarily illustrated in FIG. 2. The display 160 may be provided, for example, by using a display device, such as a liquid crystal display or an organic electroluminescence (EL) display.

The information processing apparatus 10 exemplarily illustrated in FIG. 2 may be provided, for example, by using at least one computer. The computer includes an arithmetic device such as a CPU; a storage device such as a memory or a hard disk; a communication device that uses a communication line such as the Internet; a device that reads data from a storage medium such as an optical disc, a semiconductor memory, or a card memory, and that writes data in the storage medium; a display device such as a display; and a hardware source such as an operation device that receives an operation from a user.

For example, a program (software) is read by the computer, the program corresponding to a function of at least a portion of plural portions applied with reference signs and included in the information processing apparatus 10 of the specific example illustrated in FIG. 2, and the function of the at least portion of the information processing apparatus 10 illustrated in FIG. 2 may be provided by the computer through cooperation of the hardware source included in the computer and the read software. For example, the program may be provided to the computer (the information processing apparatus 10) via a communication line such as the Internet. Alternatively, the program may be stored in a storage medium, such as an optical disc, a semiconductor memory, or a card memory, and may be provided to the computer (the information processing apparatus 10).

Moreover, an image processing apparatus including the function of the information processing apparatus 10 exemplarily illustrated in FIG. 2 may be provided. For example, the image processing apparatus may be a multifunction apparatus including plural image output functions (at least some functions of a print function, a scan function, a copy function, a facsimile function, and so forth). For example, when the image processing apparatus including the function of the information processing apparatus 10 exemplarily illustrated in FIG. 2 is a multifunction apparatus, the image processing apparatus may be placed in a providing place such as a shop, and may be used by a user of a client under contract of use.

Figure 3:
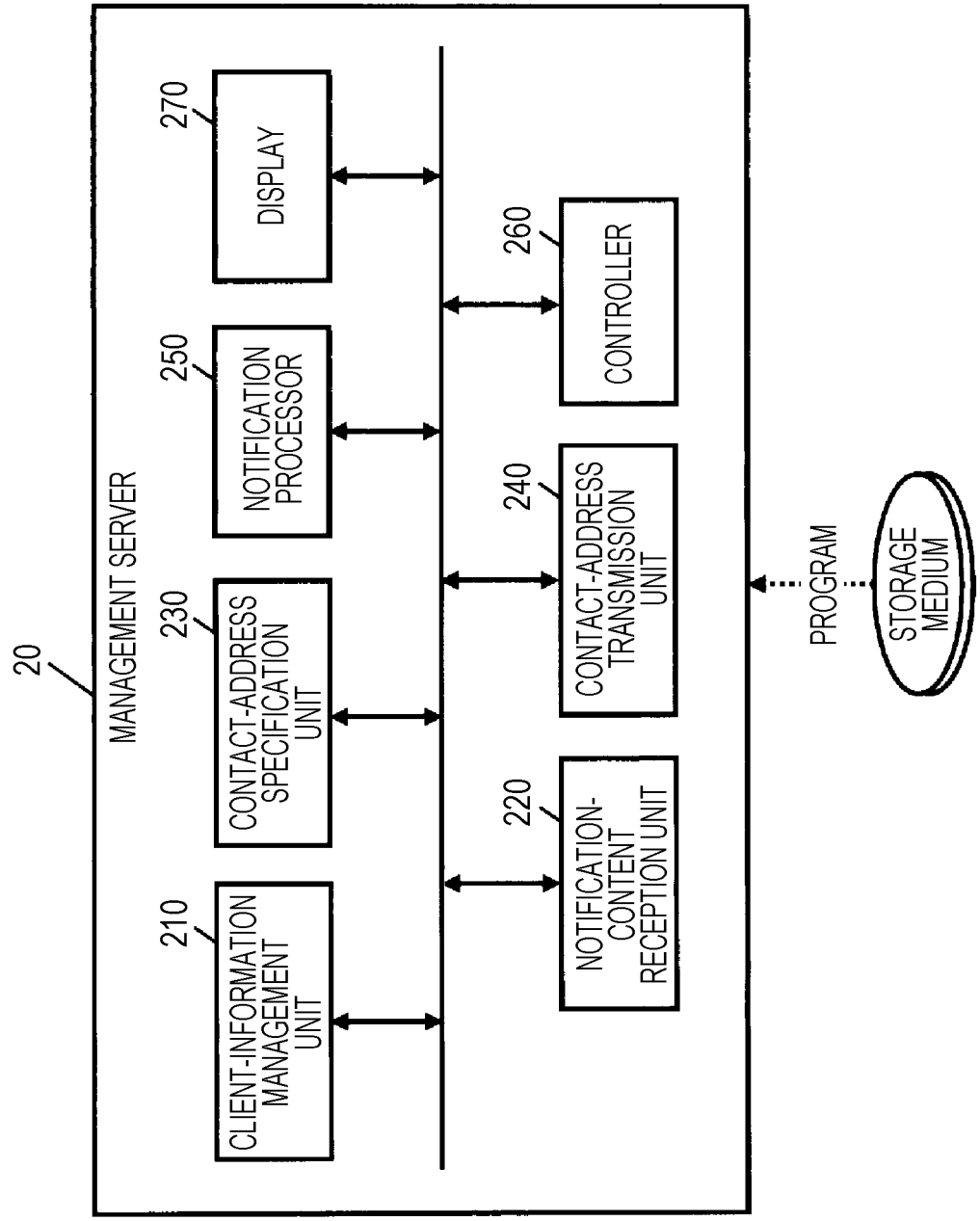
FIG. 3 illustrates a specific example of a management server.

FIG. 3 illustrates a specific example of the management server 20. FIG. 3 illustrates a specific example of the management server 20 that constitutes the information processing system in FIG. 1. In the specific example illustrated in FIG. 3, the management server 20 includes a client-information management unit 210, a notification-content reception unit 220, a contact-address specification unit 230, a contact-address transmission unit 240, a notification processor 250, a controller 260, and a display 270.

The client-information management unit 210 stores and manages client information including the contact address of the client that uses the information processing apparatus 10 (FIGS. 1 and 2). Specific examples of the contact address of the client that uses the information processing apparatus 10 include, for example, an e-mail address of the manager of the client. In addition, the client-information management unit 210 may manage contract information indicating the correspondence between the information processing apparatus 10 and the client under contract to use the information processing apparatus 10.

The notification-content reception unit 220 receives the notification content transmitted from the information processing apparatus 10. The notification-content reception unit 220 acquires, for example, the notification content transmitted from the notification-content transmission unit 120 (FIG. 2) of the information processing apparatus 10.

The contact-address specification unit 230 specifies the contact address of the client that uses the information processing apparatus 10 on the basis of the client information. The contact-address specification unit 230 may specify the contact address, for example, by selecting the contact address of the client under contract to use the information processing apparatus 10 from which the notification-content reception unit 220 has received the notification content, from among the client information that is managed by the client-information management unit 210.

The contact-address transmission unit 240 transmits the contact address of the client that uses the information processing apparatus 10 to the information processing apparatus 10. The contact-address transmission unit 240 transmits the information indicating the contact address of the client specified by the contact-address specification unit 230 to the information processing apparatus 10 that is used by the client. If the notification about the notification content is given to the contact address of the client from the management server 20, the transmission of the contact address by the contact-address transmission unit 240 to the information processing apparatus 10 may be omitted.

The notification processor 250 gives a notification about the notification content received from the information processing apparatus 10, to the contact address of the client that uses the information processing apparatus 10. The notification processor 250 transmits the notification content received by the notification-content reception unit 220 from the information processing apparatus 10, to the contact address of the client that uses the information processing apparatus 10 specified by the contact-address specification unit 230. When the notification about the notification content is given to the contact address of the client from the information processing apparatus 10, the notification about the contact address of the client by the notification processor 250 may be omitted.

The controller 260 centrally controls the entire management server 20 exemplarily illustrated in FIG. 3. The controller 260 executes, for example, control in accordance with various programs. For example, the controller 260 may be provided by using an arithmetic processing device, such as a CPU or a processor.

The display 270 displays, for example, a display image, such as a user interface image, for a manager who manages the management server 20 exemplarily illustrated in FIG. 3. The display 270 may be provided, for example, by using a display device, such as a liquid crystal display or an organic electroluminescence (EL) display.

The management server 20 exemplarily illustrated in FIG. 3 may be provided, for example, by using at least one computer. The computer includes an arithmetic device such as a CPU; a storage device such as a memory or a hard disk; a communication device that uses a communication line such as the Internet; a device that reads data from a storage medium such as an optical disc, a semiconductor memory, or a card memory, and that writes data in the storage medium; a display device such as a display; and a hardware source such as an operation device that receives an operation from a user.

For example, a program (software) is read by the computer, the program corresponding to a function of at least a portion of plural portions applied with reference signs and included in the management server 20 of the specific example illustrated in FIG. 3, and the function of the at least portion of the management server 20 illustrated in FIG. 3 may be provided by the computer through cooperation of the hardware source included in the computer and the read software. For example, the program may be provided to the computer (the management server 20) via a communication line such as the Internet. Alternatively, the program may be stored in a storage medium, such as an optical disc, a semiconductor memory, or a card memory, and may be provided to the computer (the management server 20).

The entire configuration of the information processing system (specific examples of the components thereof include the information processing apparatus 10 in FIG. 2 and the management server 20 in FIG. 3) is as described above. A specific example of processing and so forth provided by the information processing system in FIG. 1 is described next. For the configurations (portions) illustrated in FIGS. 1 to 3, the reference signs in FIGS. 1 to 3 are used in the following description.

FIG. 4 illustrates a specific example of management information that is managed by the management server 20. FIG. 4 exemplarily illustrates specific examples of management information each indicating the correspondence among a provider of a service, an apparatus, a providing place, a client name, and a contact address. The management information exemplarily illustrated in FIG. 4 includes client information such as the contact address of the client.

The provider that provides the service may be, for example, an organization, such as a company or a shop, or an individual. Specific examples of the providing place include a public space, such as a shop or a shared office. The client that uses the service may be, for example, an organization such as a company, or an individual. For example, when the client is an organization such as a company, a representative email address of the client or an email address of a manager of the client may be used as the contact address of the client. For example, when the client is an individual, an email address of the individual may be used as the contact address of the client.

In the specific example illustrated in FIG. 4, for example, a provider A of a service provides a use service of an information processing apparatus 10A in a providing place A. A client X is under contract of use with the provider A. For example, the contract of use permits each user belonging to the organization of the client X to use the information processing apparatus 10A in the providing place A. In the specific example illustrated in FIG. 4, the client X and the contact address of the client X are managed in an associated manner.

Moreover, in the specific example illustrated in FIG. 4, for example, a provider B of a service provides a use service of an information processing apparatus 10B in a providing place B. The client X and a client Y are under contract of use with the provider B. For example, the contract of use permits each user belonging to the organization of the client X to use the information processing apparatus 10B in the providing place B, and the contract of use permits each user belonging to the organization of the client Y to use the information processing apparatus 10B in the providing place B.

In the specific example illustrated in FIG. 4, for example, a provider C of a service provides a use service of an information processing apparatus 10C in a providing place C. The client Y is under contract of use with the provider C. For example, the contract of use permits each user belonging to the organization of the client Y to use the information processing apparatus 10C in the providing place C.

Figure 5:
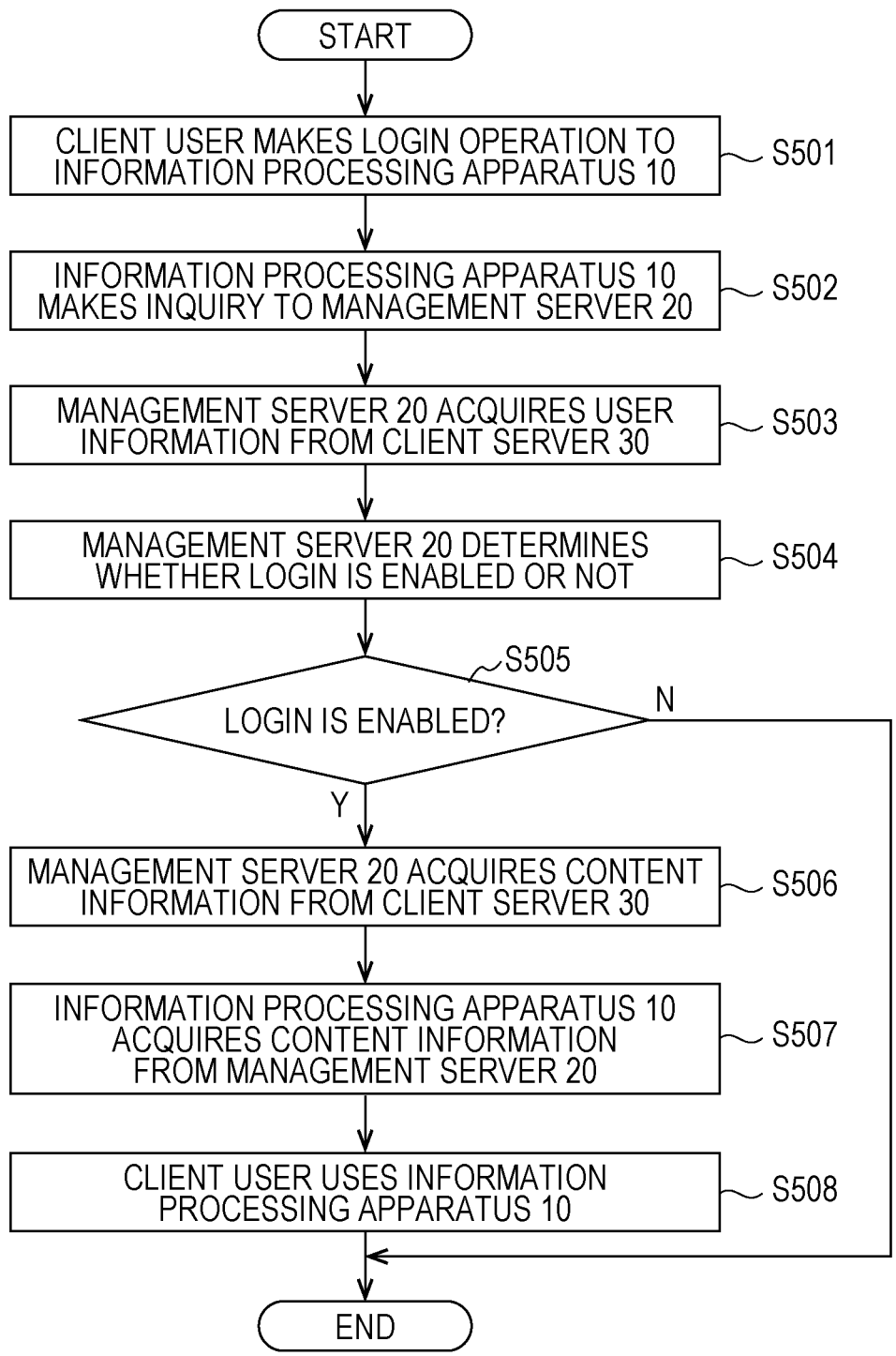
FIG. 5 illustrates an example of using the information processing apparatus by a user of a client.

FIG. 5 is an illustration (a flowchart) of an example of using an information processing apparatus 10 by a user of a client. In the specific example in FIG. 5, first, the user of the client executes a login operation to the information processing apparatus 10 (S501). For example, the user belonging to the organization of the client inputs information required for logging in to the information processing apparatus 10 by using a user interface image or the like displayed on the information processing apparatus 10.

When the login operation is executed, the information processing apparatus 10 makes an inquiry to the management server 20 whether the user is able to use the information processing apparatus 10 or not (S502), and the management server 20 acquires user information from the client server 30 (S503). Then, the management server 20 determines whether the user who made the login operation to the information processing apparatus 10 is able to log in to the information processing apparatus 10 (S504).

For example, when the user (login user) who made the login operation to the information processing apparatus 10 is the user of the client under contract to use the information processing apparatus 10, and when the user information acquired by the management server 20 from the client server 30 of the client includes information corresponding to the login user, it is determined that the login user is an authorized user previously registered and having eligibility for use, and hence is able to log in to the information processing apparatus 10 (S505).

When it is determined that login is enabled, the management server 20 acquires content information from the client server 30 (S506). The management server 20 acquires, for example, content information from the client server 30 of the client to which the login user belongs. Then, the information processing apparatus 10 acquires the content information from the management server 20 (S507), and the user who is the login user uses the information processing apparatus 10 (S508). For example, when the content information includes information on a user interface image customized for a user of the client, the user interface image may be displayed on the display 160 of the information processing apparatus 10, and the user of the client may operate the information processing apparatus 10 by using the displayed user interface image.

For example, when the user information acquired by the management server 20 from the client server 30 does not include information corresponding to the login user, it is determined that the login user is not a user under contract of use, and login is not enabled (S505). Unless login is enabled, the login user is not permitted to use the information processing apparatus 10, and the flowchart in FIG. 5 is ended.

Management of the information processing apparatus 10 by the apparatus manager is described next. FIGS. 6 to 9 each illustrate a specific example of a display image that is displayed on the information processing apparatus 10.

Figure 6:
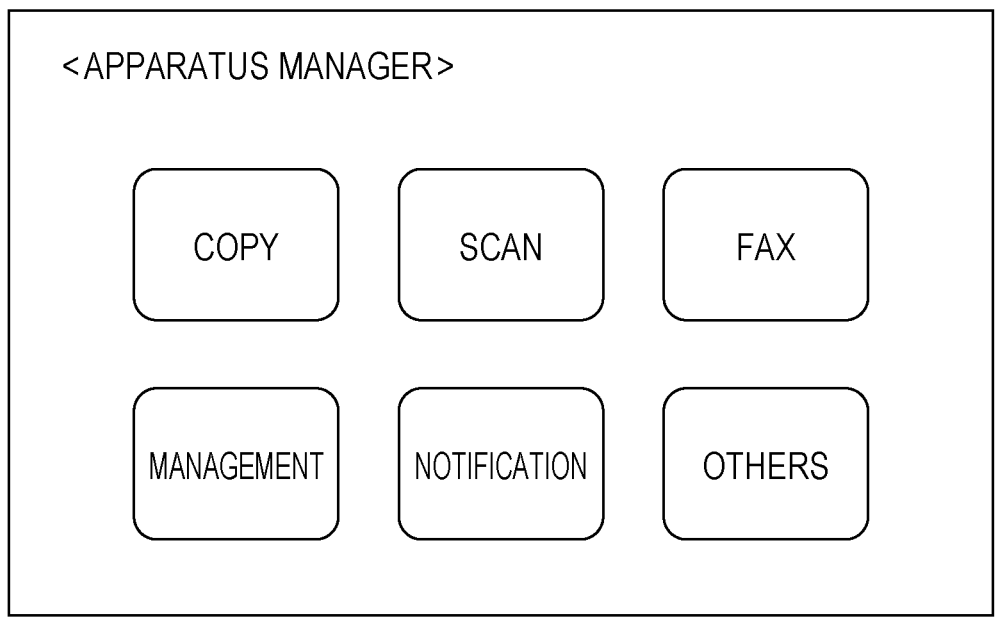
FIG. 6 illustrates a specific example of a display image that is used for managing the information processing apparatus.

FIG. 6 illustrates a specific example of a display image that is used for managing the information processing apparatus 10. For example, when an image processing apparatus having the function of the information processing apparatus 10 is a multifunction apparatus, and when the apparatus manager logs in to the information processing apparatus 10 on the authority as the manager, the display image exemplarily illustrated in FIG. 6 is displayed on the display 160 of the information processing apparatus 10.

The display image exemplarily illustrated in FIG. 6 includes plural buttons corresponding to plural functions provided by the multifunction image processing apparatus having the function of the information processing apparatus 10. When the apparatus manager operates each of the buttons in the display image in FIG. 6, the display image is changed to a display image of the function corresponding to the button.

For example, by operating a "copy" button, a display image relating to the function of copy is displayed; by operating a "scan" button, a display image relating to the function of scan is displayed; and by operating a "FAX" button, a display image relating to the function of facsimile (FAX) is displayed.

Moreover, by operating a "management" button, the display image may be changed to a display image that is used for settings or changes relating to the apparatus information that is managed by the apparatus-information management unit 140 of the information processing apparatus 10.

Furthermore, the display image exemplarily illustrated in FIG. 6 includes a "notification" button. By operating the "notification" button, the display image is changed to a display image relating to a notification function for making a notification about the notification content of the apparatus manager.

Figure 7:
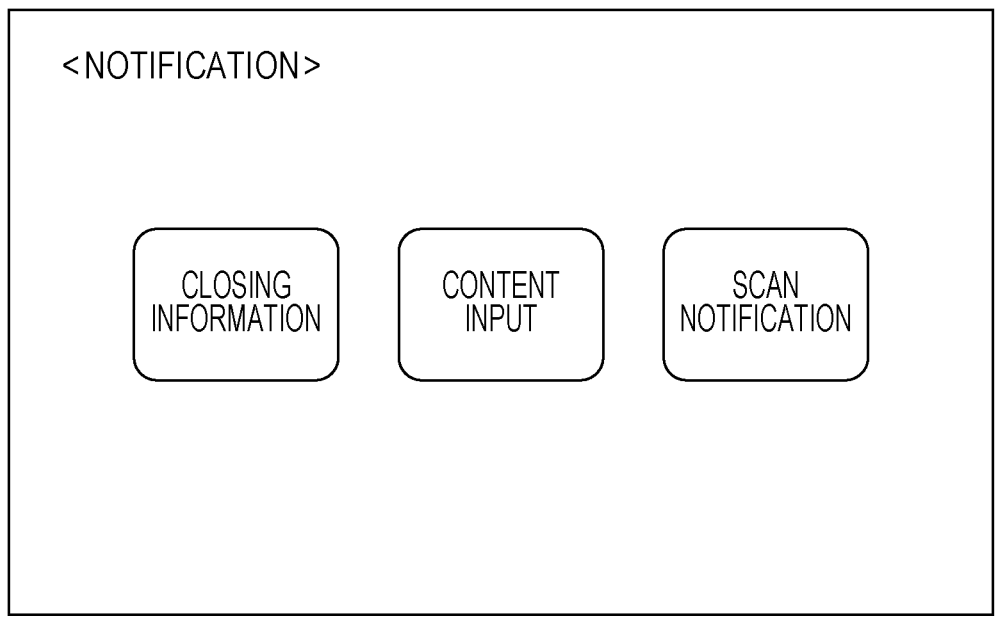
FIG. 7 illustrates a specific example of a display image relating to a notification function.

FIG. 7 illustrates a specific example of a display image relating to the notification function. For example, when the "notification" button is operated in the display image illustrated in FIG. 6, the display image exemplarily illustrated in FIG. 7 is displayed on the display 160 of the information processing apparatus 10. When the apparatus manager operates each of the buttons in the display image in FIG. 7, the display image is changed to a display image of the notification function corresponding to the button.

For example, by operating a "closing information" button, a display image that is used for inputting closing information is displayed; by operating a "content input" button, a display image that is used for inputting a notification content is displayed; and by operating a "scan notification" button, a display image relating to the function of scan notification is displayed. In scan notification, a character or an image on a sheet of paper or the like may be optically read by a scanner, and the read character or image may be input as a notification content to the information processing apparatus 10.

FIG. 8 illustrates a specific example of a display image that is used for inputting closing information. For example, when the "closing information" button is operated in the display image illustrated in FIG. 7, a display image exemplarily illustrated in FIG. 8 is displayed on the display 160 of the information processing apparatus 10.

The apparatus manager inputs, for example, the dates of closing days (for example, the start date and end date) by following the guidance that is displayed in the display image in FIG. 8. Then, when the apparatus manager operates a "notification OK" button after the apparatus manager inputs dates, processing of making a notification about a notification content indicating that the input dates are closing days is executed. For example, the processing of making a notification about the notification content may be provided merely by inputting limited information such as the dates like the specific example illustrated in FIG. 8.

FIG. 9 illustrates a specific example of a display image that is used for inputting a notification content. For example, when the "content input" button is operated in the display image illustrated in FIG. 7, the display image exemplarily illustrated in FIG. 9 is displayed on the display 160 of the information processing apparatus 10.

The apparatus manager inputs, for example, the content for notification in an "input field" by following the guidance that is displayed in the display image in FIG. 9. Then, when the apparatus manager operates a "notification OK" button after inputting a notification about the notification content, the processing of making a notification about the input notification content is executed. For example, to make a notification about the content which is not sufficiently expressed by a prepared template sentence (for example, a specific example in FIG. 8), the display image in FIG. 9 may be used and a desirable notification content may be input.

Figure 10:
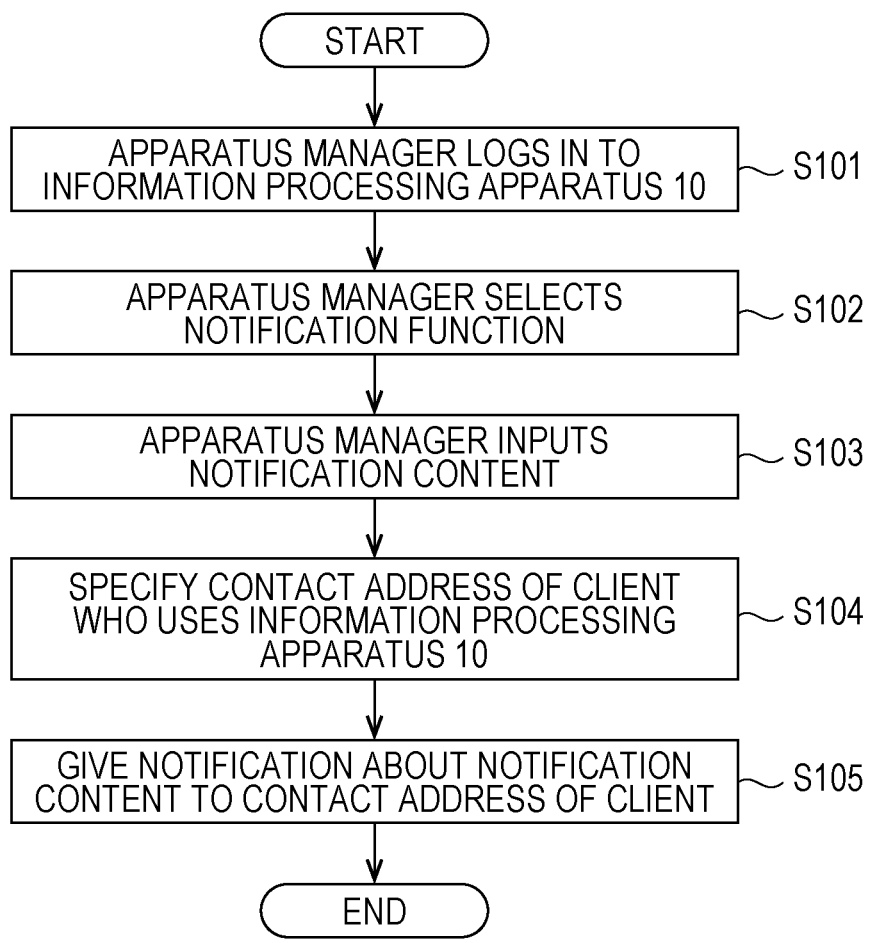
FIG. 10 illustrates an example of using the notification function of the information processing apparatus by an apparatus manager.

FIG. 10 is an illustration (a flowchart) of an example of using the notification function of the information processing apparatus 10 by the apparatus manager. In the specific example in FIG. 10, first, the apparatus manager logs in to the information processing apparatus 10 (S101). For example, the apparatus manager logs in to the information processing apparatus 10 that is managed by the apparatus manager on the authority as a manager. When the apparatus manager logs in to the information processing apparatus 10 on the authority as the manager, for example, the display image exemplarily illustrated in FIG. 6 is displayed on the display 160 of the information processing apparatus 10.

Then, the apparatus manager selects the notification function (S102). For example, when the apparatus manager operates the "notification" button in the display image exemplarily illustrated in FIG. 6, the display image is changed to a display image relating to the notification function for making a notification about the notification content of the apparatus manager. Accordingly, the display image exemplarily illustrated in FIG. 7 is displayed on the display 160 of the information processing apparatus 10.

Then, the apparatus manager inputs a notification content (S103). For example, when the apparatus manager operates the "closing information" button or the "content input" button in the display image exemplarily illustrated in FIG. 7, the display image is changed to a display image that is used for inputting the notification content. Accordingly, the display image illustrated in FIG. 8 or FIG. 9 is displayed on the display 160 of the information processing apparatus 10. The apparatus manager inputs the notification content by using the display image, and then operates the "notification OK" button. For example, the display image relating to the function of scan notification may be displayed by the apparatus manager operating the "scan notification" button in the display image exemplarily illustrated in FIG. 7. With the scan notification, for example, a character or an image read from a sheet of paper may be input as a notification content to the information processing apparatus 10.

When the notification content is input, the contact address of the client that uses the information processing apparatus 10 is specified (S104), and notifies the contact address of the client about the notification content (S105). As a specific example in a period from when the notification content is input to when the notification about the notification content is given, for example, a first notification example or a second notification example described as follows is executed.

In the first notification example, when the notification content is input, in response to a request from the information processing apparatus 10 to the management server 20, the contact-address specification unit 230 of the management server 20 specifies the contact address of the client that uses the information processing apparatus 10, and the specified contact address is transmitted from the management server 20, to the information processing apparatus 10. Then, the notification-content transmission unit 120 of the information processing apparatus 10 gives a notification about the notification content to the contact address of the client obtained from the management server 20.

For example, when the notification content is input from the apparatus manager of the information processing apparatus 10A (FIG. 1), in response to a request from the information processing apparatus 10A, the contact-address specification unit 230 of the management server 20 specifies the contact address of the client that uses the information processing apparatus 10A. For example, as far as the client-information management unit 210 of the management server 20 manages the management information exemplarily illustrated in FIG. 4, a contact address "admiX@xxx.jp" of the client X under contract to use the information processing apparatus 10A is specified from the client information included in the management information exemplarily illustrated in FIG. 4. Then, the notification-content transmission unit 120 of the information processing apparatus 10A gives a notification about the notification content to the contact address of the client X.

In contrast, in the second specific example, when the notification content is input, the notification content is transmitted from the notification-content transmission unit 120 of the information processing apparatus 10, and the notification-content reception unit 220 of the management server 20 receives the notification content. Then, the contact-address specification unit 230 specifies the contact address of the client that uses the information processing apparatus 10 on the basis of the client information. The notification processor 250 of the management server 20 gives a notification about the notification content to the specified contact address of the client.

For example, when the notification content is input from the apparatus manager of the information processing apparatus 10B (FIG. 1), the notification content is transmitted from the information processing apparatus 10B to the management server 20, and the contact-address specification unit 230 of the management server 20 specifies the contact address of the client that uses the information processing apparatus 10B. For example, as far as the client-information management unit 210 of the management server 20 manages the management information exemplarily illustrated in FIG. 4, a contact address "admiX@xxx.jp" of the client X, and a contact address "admiY@yyy.jp" of the client Y under contract to use the information processing apparatus 10B is specified from client information included in the management information exemplarily illustrated in FIG. 4. Then, the notification processor 250 of the management serve 20 gives a notification about the notification content to the contact address of the client X and the contact address of the client Y.

When the notification about the notification content is given to the contact address of the client, the processing exemplarily illustrated in the flowchart of FIG. 10 is ended.

Figure 11:
FIG. 11 illustrates a first specific example of a notification content (closing information)

FIG. 11 illustrates a first specific example of a notification content. FIG. 11 illustrates a specific example of a notification content for a notification about closing information. For example, by the apparatus manager inputting the dates by using the display image exemplarily illustrated in FIG. 8, the notification content of the closing information exemplarily illustrated in FIG. 11 may be provided. For example, the apparatus manager may input the notification content exemplarily illustrated in FIG. 11 by using the display image exemplarily illustrated in FIG. 9. Then, for example, the notification about the notification content exemplarily illustrated in FIG. 11 is given to the contact address of the client.

The notification content notified to the contact address of the client may be registered in the client server 30 that is managed by the client. For example, when the contact address of the client is the email address of the manager of the client, the manager of the client that has received the notification content may register the notification content in the client server 30 of the client.

Furthermore, the client server 30 of the client may transmit the registered notification content to an apparatus that is used by each user belonging to the organization of the client. For example, the notification content may be transmitted to a mobile terminal apparatus of each user, the notification content may be displayed on the information processing apparatus 10 when each user logs in to the information processing apparatus 10, or an image indicating the notification content may be output by a printout. In this way, for example, a user of the client X who uses the information processing apparatus 10B in the providing place B may be notified about closing information of a shop A that is a providing place A.

Figure 12:
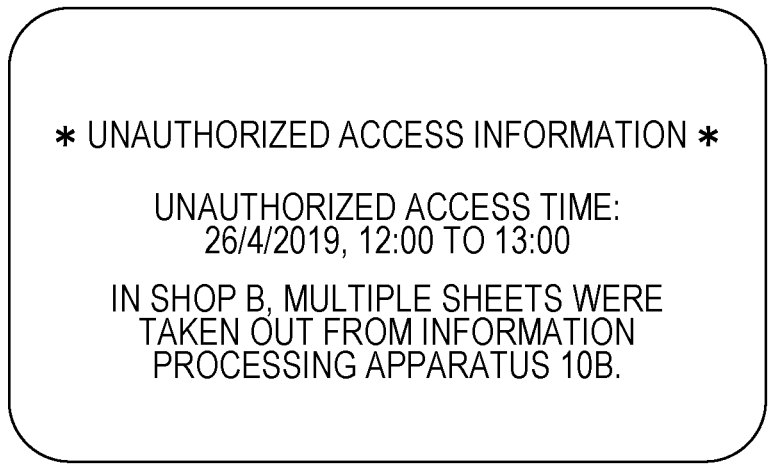
FIG. 12 illustrates a second specific example of a notification content (unauthorized access information).

FIG. 12 illustrates a second specific example of a notification content. FIG. 12 illustrates a specific example of the notification content for a notification about unauthorized access information. For example, the apparatus manager may input the notification content exemplarily illustrated in FIG. 12 by using the display image exemplarily illustrated in FIG. 9. Then, for example, a notification about the notification content exemplarily illustrated in FIG. 12 is given to the contact address of the client.

For example, when the manager of the client Y is notified about the unauthorized access information exemplarily illustrated in FIG. 12, the manager of the client Y may specify an unauthorized user who used the information processing apparatus 10B at an unauthorized access time in the shop B that is the providing place B, and may restrict the use of the information processing apparatus 10B by the unauthorized user as needed. For example, the use may be restricted by inhibiting the unauthorized user from logging in to the information processing apparatus 10B. Moreover, when the unauthorized user executes a login operation to the information processing apparatus 10B, a message or the like indicating that the use by the unauthorized user is stopped may be displayed on the display 160 of the information processing apparatus 10B.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system in which a client uses an information processing apparatus that is managed by an apparatus manager, comprising:
   a management unit that manages client information including a contact address of a client;
   an acquisition unit that acquires a notification content from an apparatus manager;
   a specification unit that specifies a contact address of a client that uses an information processing apparatus that is managed by the apparatus manager from which the acquisition unit has acquired the notification content, on the basis of the client information that is managed by the management unit; and
   a notification unit that gives a notification about the notification content acquired by the acquisition unit to the contact address of the client specified by the specification unit,
   wherein the client information includes a contact address of a client that uses the information processing apparatus, the contact address not being viewable from the apparatus manager of the information processing apparatus.

2. The information processing system according to claim 1, further comprising:
an information processing apparatus that is managed by an apparatus manager and that is used by a client; and
a management apparatus that manages client information including a contact address of a client that uses the information processing apparatus,
wherein the information processing apparatus includes
an acquisition unit that acquires a notification content from the apparatus manager of the information processing apparatus,
an acquisition unit that acquires a contact address of a client that uses the information processing apparatus from the management apparatus, and
a notification unit that gives a notification about the notification content acquired from the apparatus manager to the contact address of the client acquired from the management apparatus.

3. The information processing system according to claim 2, further comprising:
a client apparatus that is managed by a client that uses the information processing apparatus,
wherein the client apparatus includes
a registration unit that registers the notification content a notification of which has been given to a contact address of the client that manages the client apparatus, and
a transmission unit that transmits the registered notification content to an apparatus that is used by a user belonging to an organization of the client.

4. The information processing system according to claim 2,
wherein, from the notification content of a notification given to a contact address of a client, when an unauthorized user belonging to an organization of the client is specified, use of the information processing apparatus by the unauthorized user is restricted in accordance with an instruction from the client.

5. The information processing system according to claim 1, further comprising:
an information processing apparatus that is managed by an apparatus manager and that is used by a client; and
a management apparatus that manages client information including a contact address of a client that uses the information processing apparatus,
wherein the information processing apparatus includes
an acquisition unit that acquires a notification content from the apparatus manager of the information processing apparatus, and
a transmission unit that transmits the notification content acquired from the apparatus manager to the management apparatus, and
wherein the management apparatus includes
a reception unit that receives the notification content transmitted from the information processing apparatus,
a specification unit that specifies a contact address of a client that uses the information processing apparatus, on the basis of the client information, and
a notification unit that gives a notification about the notification content received from the information processing apparatus, to the contact address of the client that uses the information processing apparatus.

6. The information processing system according to claim 5, further comprising:
a client apparatus that is managed by a client that uses the information processing apparatus,
wherein the client apparatus includes
a registration unit that registers the notification content a notification of which has been given to a contact address of the client that manages the client apparatus, and
a transmission unit that transmits the registered notification content to an apparatus that is used by a user belonging to an organization of the client.

7. The information processing system according to claim 5,
wherein, from the notification content of a notification given to a contact address of a client, when an unauthorized user belonging to an organization of the client is specified, use of the information processing apparatus by the unauthorized user is restricted in accordance with an instruction from the client.

8. The information processing system according to claim 1, further comprising:
a client apparatus that is managed by a client that uses the information processing apparatus,
wherein the client apparatus includes
a registration unit that registers the notification content a notification of which has been given to a contact address of the client that manages the client apparatus, and
a transmission unit that transmits the registered notification content to an apparatus that is used by a user belonging to an organization of the client.

9. The information processing system according to claim 1,
wherein, from the notification content of a notification given to a contact address of a client, when an unauthorized user belonging to an organization of the client is specified, use of the information processing apparatus by the unauthorized user is restricted in accordance with an instruction from the client.

10. The information processing system according to claim 1, further comprising:
an information processing apparatus that is managed by an apparatus manager and that is used by a client,
wherein the information processing apparatus includes
an acquisition unit that acquires a notification content from the apparatus manager who manages the information processing apparatus,
an acquisition unit that acquires a contact address of a client that uses the information processing apparatus, from a management apparatus that manages client information including a contact address of a client, and
a notification unit that gives a notification about the notification content acquired from the apparatus manager to the contact address of the client acquired from the management apparatus.

11. The information processing system according to claim 1, comprising:
a management apparatus that manages client information including a contact address of a client that uses an information processing apparatus,
wherein the management apparatus includes
a reception unit that receives a notification content that is transmitted from the information processing apparatus and that is from an apparatus manager of the information processing apparatus,
a specification unit that specifies a contact address of a client that uses the information processing apparatus, on the basis of the client information, and a notification unit that gives a notification about the notification content received from the information processing apparatus, to the contact address of the client that uses the information processing apparatus.

12. A non-transitory computer readable medium storing a program causing at least one computer that constitutes an information processing system in which a client uses an information processing apparatus that is managed by an apparatus manager, to execute a process for information processing, the process comprising:
- managing client information including a contact address of a client;
- acquiring a notification content from an apparatus manager;
- specifying a contact address of a client that uses an information processing apparatus that is managed by the apparatus manager from which the notification content has been acquired in the acquiring, on the basis of the client information that is managed in the managing; and
- giving a notification about the notification content acquired in the acquiring to the contact address of the client specified in the specifying,
- wherein the client information includes a contact address of a client that uses the information processing apparatus, the contact address not being viewable from the apparatus manager of the information processing apparatus.

13. An information processing system in which a client uses an information processing apparatus that is managed by an apparatus manager, comprising:
- management means for managing client information including a contact address of a client;
- acquisition means for acquiring a notification content from an apparatus manager;
- specification means for specifying a contact address of a client that uses an information processing apparatus that is managed by the apparatus manager from which the acquisition means has acquired the notification content, on the basis of the client information that is managed by the management means; and
- notification means for giving a notification about the notification content acquired by the acquisition means to the contact address of the client specified by the specification means
- wherein the client information includes a contact address of a client that uses the information processing apparatus, the contact address not being viewable from the apparatus manager of the information processing apparatus.

* * * * *